United States Patent [19]

Hirschmann

[11] Patent Number: 5,236,968

[45] Date of Patent: Aug. 17, 1993

[54] LACQUER HARDENABLE BY UV RADIATION

[75] Inventor: Peter Hirschmann, Fürth/Bay, Fed. Rep. of Germany

[73] Assignee: Uvex Winter Optik GmbH, Fürth/Bay, Fed. Rep. of Germany

[21] Appl. No.: 769,026

[22] Filed: Sep. 1, 1991

[51] Int. Cl.$^5$ .................. C08F 2/50; C08F 20/36; C08K 5/05; C08K 5/10

[52] U.S. Cl. ........................ 522/78; 522/79; 522/90; 522/91; 522/96; 526/279; 526/312; 428/412

[58] Field of Search ............ 522/91, 90, 78, 96, 522/79; 428/412; 526/279, 312

[56] References Cited

U.S. PATENT DOCUMENTS

| | | | |
|---|---|---|---|
| 3,585,065 | 6/1971 | Johnson | 522/91 |
| 3,673,140 | 6/1972 | Ackerman et al. | 522/33 |
| 4,477,548 | 10/1984 | Harasta et al. | 522/91 |
| 4,650,845 | 3/1987 | Hegel | 526/261 |
| 4,889,768 | 12/1989 | Yokoshima et al. | 522/90 |

*Primary Examiner*—Marion E. McCamish
*Assistant Examiner*—Susan Berman
*Attorney, Agent, or Firm*—Browdy and Neimark

[57] ABSTRACT

UV hardenable lacquer, in particular for molded polycarbonate (PC) bodies, comprising:

(A) 5 to 60%, referring to the total weight of 100% of the entire mixture, of an aliphatic polyurethane acrylate, preferably 5 to 20% of a hexa-functional PU acrylate;

(B) 30 to 45%, referring to the total weight of 100% of the entire mixture, of a cross-linkable, polyfunctional acrylate having less than 20 C atoms in the molecule;

(C) 0.01 to 3%, referring to the total weight of 100% of the entire mixture, of a cross-linkable polyfunctional silicon acrylate;

(D) if required, between 1 and 5%, referring to the total weight of 100% of the entire mixture, of a monofunctional, ethylenically unsaturated compound such as N-vinyl pyrrolidone;

(E) 0 to 70% referring to the total weight of 100% of the entire mixture, of organic solvents;

(F) photo initiators; and (G) light protector.

11 Claims, No Drawings

LACQUER HARDENABLE BY UV RADIATION

FIELD OF INVENTION

The present invention relates to a lacquer hardenable by UV radiation, particularly for molded polycarbonate parts, use of the lacquer, i.e. a method for coating molded bodies with the lacquer, and to the molded body coated with the lacquer.

BACKGROUND OF INVENTION

Molded polycarbonate bodies are often used because of their resistance to shocks and knocks, their tensile strength and transparency. However, the surface properties of polycarbonate materials, such as poor resistance against scratches and wear as well as sensitivity to many solvents and chemicals, considerably limit their use particularly as break-resistant "glass".

A multitude of proposals have been previously offered for obviating these shortcomings, for example the application of coatings based on melamine resins or polysiloxane resins, such as described for example in U.S. Pat. Nos. 3,707,397 and 3,843,390.

However, these coatings have additional disadvantages, aside from difficulties in manufacturing. For example, it is necessary to apply these as lacquers or coatings containing solvents, some of which attack polycarbonates, where cross linking must be performed at higher temperatures. This may negatively affect transparency, as well as the positive properties of consistency of the molded polycarbonate bodies, up to and including breaking of the coated part because of brittleness.

It appears that UV hardening coating systems would be particularly suitable for applying protective coatings onto polycarbonate because of their quick hardening at low temperature. Examples of this approach are set forth in U.S. Pat. No. 3,968,305 and PCT Publication WO 80/00968. However, scratch resistance as well as adhesion to the substrate are not satisfactory in both of these prior systems, and the mechanical properties of the coated part also suffer.

In accordance with German Patent Disclosure DE-A-38 19 627, reaction products of hydroxyl alkyl acrylates with aliphatic polyisocyanates, containing at least two isocyanate groups and at least one biuret group per molecule and/or uretdion, i.e. a cyclo-dimerized isocyanate with two ketone groups, are used for scratch-proof coatings of molded polycarbonate bodies and are hardened by UV radiation. However, the scratch resistance of the surface layer of the polycarbonate parts coated in this manner is not as glassily hard as desired. Additionally, the mechanical strength of the parts coated in accordance with German Patent Disclosure DE-A-38 19 627 is unsatisfactory. Depending on the stress applied, injection molded bodies can break because of brittleness.

German Patent Disclosure DE-A-31 34 157 discloses coating compositions which essentially use greater amounts of N-vinyl derivatives or of cyclic, secondary amides. In this case it is disadvantageous that UV irradiation has to be performed several times to obtain satisfactory scratch resistant surface, such as stated in Example 1 of German Patent Disclosure DE-A-31 34 157. It is only possible to attain low viscosity of the coating solution by the use of larger proportions of monofunctional compounds, such as N-vinyl pyrrolidone. However, if this is done, the scratch resistant surface, which in any event does not have the desired glassy hardness, is further weakened and weathering resistance is also reduced. Added to this is the danger of etching, whitening and triggering of stress cracking of the polycarbonate in the wet state of the coating, i.e. prior to coating hardening.

SUMMARY OF THE INVENTION

Based on the above, it is an object of the invention to overcome deficiencies of the prior art such as indicated above.

Another object is to provide an improved UV-hardenable lacquer for coating of polycarbonate molded bodies or panels, so that a high degree of mechanical strength as well as glass-like hardness of the surface of the coating is achieved, along with satisfactory weathering stability, while avoiding whitening and the triggering of stress cracking.

These objects are attained by a lacquer coating comprising a mixture of di-, tri-, tetra- and hexa-functional acrylates in exactly measured ratios, which results in an optimal degree of cross-linking of the coating.

DETAILED DESCRIPTION OF EMBODIMENTS

This lacquer composition desirably comprises:

(A) 5 to 60%, with respect to the total weight of 100% of the entire mixture, of an aliphatic polyurethane acrylate such as T1200 and T1600 (Rahn) and Photomer 6261 (Harcros), preferably 5 to 20% of a hexa-functional PU acrylate, such as Ebecryl 1290 (from UCB); while aromatic PU acrylates may also be used, these are not preferred as they tend to become slightly yellow upon aging;

(B) 30 to 45%, with respect to the total weight of 100% of the entire mixture, of a cross-linkable, polyfunctional acrylate having less than 20 C atoms in the molecule, such as pentaerythritol acrylate, e.g. a mixture of pentaerythritol tri- and tetra-acrylates, pentaerythritol tri-acrylate, pentaerythritol tetra-acrylate, and/or di/trimethylol propane tetraacrylate;

(C) 0.01 to 3%, with respect to the total weight of 100% of the entire mixture, of a cross-linkable polyfunctional polymeric silicon acrylate, e.g. a di-functional silicon acrylate such as Ebecryl 350 (from UBC) or a hexa-functional silicon acrylate such as Ebecryl 1360 (also from UBC);

(D) Optionally, between 1 and 5%, based on the total weight of 100% of the entire mixture, of a mono-functional, ethylenically unsaturated compound such as N-vinyl pyrrolidone, tetrahydro furfuryl acrylate or hydroxy ethyl methacrylate;

(E) 0 to 70%, with respect to the total weight of 100% of the entire mixture, of one or more suitable and compatible, commercially available organic solvents, preferably non-aprotic. Possible solvents are alcohols, ether alcohols, ester and ethylene glycol ether ester. A partial listing includes: methanol, ethanol, n-propanol, isopropanol, n-butanol, isobutanol, ethoxyethanol, methoxypropanol, ethoxypropanol, methoxybutanol, ethyl acetate, butyl acetate, methylglycol acetate, butyl glycol acetate;

(F) A photo initiator such as diethoxyacetophenone (DEAP). Commercially available products on the basis of phenyl ketone, acrylic ketone and acetophenone are used as photo initiators;

(G) 0.5 to 5%, based on the total composition, of light protector, such as benzotriazole, hydroxybenzophenone, oxalanilide or sterically hindered amines or sterically hindered amides.

By means of coating the polycarbonate body with the lacquer of the invention and subsequent curing, the surfaces of the molded polycarbonate body is hardened by the provision of a glass-like, hard layer, even at very small layer thicknesses of approximately only 5 μm. This layer is distinguished by the following advantageous characteristics:

excellent adhesion, even to un-pretreated polycarbonate, i.e. tempering, corona or plasma treatments are not required; it is even possible to omit priming of the polycarbonate surface;

no impairment of the optical properties of the finished part i.e. no whitening or swelling of the polycarbonate substrate;

no impairment of the mechanical strength of the polycarbonate part;

no undesirable build-up of tension between the polycarbonate substrate and the coating, even at increased layer thicknesses, and thus no chipping or splintering of the coating in case of mechanical impact stress on the coated polycarbonate body;

great hardness of the surface with maximum flexibility of the coating, such as is desired for transparent parts in the optical field;

additionally, excellent smoothness of the surface, which can be controlled by varying the amount of component C. Thus, increasing amounts of component C increases smoothness, but at quantities exceeding about 3% flow disruptions become increasingly problematic.

In contrast with many known scratch-resistant surface coatings, which additionally may have a large degree of surface smoothness, the parts hardened with the coating in accordance with the present invention can also be further worked. Blanks, made of injection-molded polycarbonate and coated with the lacquer of the present invention and hardened in accordance with the present method, can be cut, drilled or milled without the occurrence of very fine hairline cracks.

In the same way it is possible to mark or decorate parts produced in accordance with the invention by means of known printing methods, such as screen printing and ink block printing. To do this this, it is not necessary as a rule to pre-treat the parts prior to printing, but this depends on the ink. While, because of the smoothness of the surface of conventional coatings, for example of certain melamine-formaldehyde combinations and polysiloxane systems, markings and decorations are impossible because of lack of adhesion of the ink, adhesion and wear of the parts hardened with the UV-hardening lacquer in accordance with the present invention is excellent in spite of an increase in surface smoothness.

It is also possible to emboss, e.g. cold-stamp, letters and numbers for the purpose of markings, such as are prescribed by various standards and regulations for parts used as protective work devices or in motor vehicles. No chipping, loss of adhesion or cracks occur in the above described coatings following this treatment.

The possibility of freely setting the viscosity of the coating mixtures as needed by the addition of conventional solvents, such as alcohols and esters including those mentioned above, opens a broad range of uses which is not attained by any of the previously mentioned UV-hardening coating materials for polycarbonates.

Even in connection with geometrically complex molded shapes it is practical to produce, by appropriate hardening of the surfaces, a non-breaking part with a glass-like surface, which is nevertheless light-weight.

Because, in contrast with the previously mentioned prior art coating mixtures, no inert gas atmosphere is required for UV-hardening of the coated, production conditions are considerably simplified even for geometrically complex part. Manufacture of the coating mixture requires only simple technology, namely simply mixing with a high-speed agitator in a one-pot system. The described components A to G are all available commercially. An inert gas atmosphere is not necessary. It is also not necessary to prevent exposure to direct light during compounding, since mixing lasts less than 30 minutes. Setting and correction of the viscosity of the lacquer in accordance with the invention is accomplished by the addition of the conventional solvents mentioned. This can take place during mixing and/or during processing.

Coating of the substrate with the lacquer of the invention can be performed by dipping, spraying, flowing, pouring or roller application. Dipping is preferred for the coating of optical parts or parts which, from a technical point of view, are difficult to coat by other coating methods.

Pre-coating, such as is conventionally performed in the form of priming for improving adhesion of the main coating, is not required during or prior to coating by means of the method in accordance with the present invention, using the lacquer described.

Prior to hardening, the conventional solvents which are not UV-reactive, are removed to a large part by short-term heat treatment of the coated part.

Hardening of the coating composition is triggered by UV radiation, for which commercially available UV radiators, e.g. UV lamps, are used.

EXAMPLES

Three preferred embodiments of a lacquer in accordance with the invention will be described below:

EXAMPLE 1

| A: | 10 parts hexa-functional polyurethane (PU)-acrylate resin |
|---|---|
| B: | 40 parts pentaerythritol tri-tetraacrylate |
| C: | 0.05 parts di-functional silicon acrylate |
| E: | 16 parts ethanol |
|  | 16 parts i-propanol |
|  | 8 parts ethyl acetate |
|  | 8 parts butanol |
| F: | 1 part photo initiator |

EXAMPLE 2

| A: | 5 parts hexa-functional PU-acrylate resin |
|---|---|
| B: | 45 parts pentaerythritol tri-tetraacrylate |
| C: | 3 parts di-functional silicon acrylate |
| E: | 16 parts ethanol |
|  | 16 parts i-propanol |
|  | 8 parts ethyl acetate |
|  | 8 parts butanol |
| F: | 1 part photo initiator |
| G: | 1 part light protector |

EXAMPLE 3

| | |
|---|---|
| A: | 20 parts hexa-functional PU-acrylate resin |
| B: | 30 parts pentaerythritol tri-tetraacrylate |
| C: | 1 part di-functional silicon acrylate |
| D: | 2 parts N-vinyl pyrrolidone |
| E: | 16 parts ethanol |
| | 16 parts i-propanol |
| | 8 parts ethyl acetate |
| | 8 parts butanol |
| F: | 1 part photo initiator |

Manufacture of the mixture takes place in accordance with the following example:
800 g ethanol
800 g isopropanol
400 g ethyl acetate
400 g butanol are placed into an open 8-liter vessel. Then,
2000 g pentaerythritol tri-tetraacrylate
500 g hexa-functional polyurethane acrylate resin
2.5 g di-functional silicon acrylate resin are added and mixed to form a homogeneous composition.

Following this, 50 g photo initiator are admixed and dissolved. If necessary, the light resistance can be adjusted by mixing in 50 g of light protector.

Additionally, means to promote the process and to improve aeration, known and commercially available in connection with the production and processing of lacquer, can be used in conventional concentrations, if needed.

A nitrogen or inert gas atmosphere is neither required during mixing nor during storage or processing.

The pot life of the lacquer during processing is one week, provided that direct UV radiation of the lacquer container is avoided.

In detail, the method in accordance with the invention takes place, for example, as follows:

A molded body, such as a flat meniscus lens having a concave/convex geometry and made from commercially available polycarbonate granulate, is dipped by means of a pneumatic/hydraulic device into one of the above described mixtures and evenly removed from the mixture, so that a homogeneous thickness of the wet coating is attained, depending on viscosity and rate of removal.

The flat meniscus lens treated in this manner is then placed into a drying oven, such as for two minutes at 80° C. or for half a minute at 120° C. Use of infrared radiators is also possible during the drying stage. At a surface temperature of the flat meniscus lens of 120° C., for example, the coated lens is irradiated for half a minute. In the course of this operation the non-reactive solvents evaporate to such an extent that UV hardening can then be performed without problems. Subsequently, the polycarbonate flat meniscus lens treated in this manner, while still suspended on the dipping device, is moved past two UV-mercury radiators (output 80 W/cm) at a forward speed of 1 m/min to 5 m/min, so that its front and back surfaces are hardened. An atmosphere of inert gas or nitrogen is not required for this operation.

In spite of the high degree of cross-linking, the hardened coating on the lenses shows almost no shrinkage and no interior tension which would have a negative effect on the mechanical strength of the completed part. When checking the mechanical strength, it is found that the same mechanical properties are attained by means of the above mentioned treatment of flat meniscus lenses as with an uncoated polycarbonate flat meniscus lens.

A falling dart test and a bombardment test were chosen as test methods. The following test methods were employed:

(1) Falling dart test similar to DIN 52 307 (falling dart test of safety glass windshield for vehicle windows).

Falling body: Dart-shaped body of steel, provided on the impact surface With a steel ball with r=11 mm (ball from a ball bearing in accordance With DIN 5401, class III).
Mass of the falling body: 1000 g
Length of fall: 2 m
Sample taking: Analogous to DIN 4646, part 3,

British Standards (2) Bombardment test: Similar to British Standards BS 2092-1987 Impact Test of Protective Work Goggles. But sample taking similar to DIN 4646, part 3. Firing velocity 180 m/s, mass of the steel ball 1 g.

The following results were obtained:
a. Falling dart test:
Example 1: No breaking of the lens, partial elastic stretching of the lacquer, no flaking.
Example 2: No breaking of the lens, partial elastic stretching of the lacquer, no flaking.
Example 3: No breaking of the lens, partial elastic stretching of the lacquer, no flaking.
Uncoated flat meniscus lens: No breaking of the lens, cold deformation.
b. Bombardment test:
Example 1: No penetration, no breaking, no separation of the coating.
Example 2: No penetration, no breaking, no separation of the coating.
Example 3: No penetration, no breaking, no separation of the coating.
Uncoated flat meniscus lens: No penetration, no breaking.

To determine the resistance to scratching of a coated lens, the increase of scattered light in the form of reduced luminance in accordance with DIN 4646, part 2, was measured after the sample had been sprinkled with quartz sand in accordance with the sand sprinkling method (DIN 52 348).

The following results were obtained:

| Example No. | Scattered Light Increase $\frac{cd/m^2}{lx}$ |
|---|---|
| 1 | 1.0 |
| 2 | 1.6 |
| 3 | 1.7 |

(The values relate to a coating thickness of $5 \pm 1$ μm)

Adhesiveness of the coating was tested by means of the cross cutting test similar to DIN 53 151 cross cutting test of coatings).

For this purpose a grid of 6×6 lines at a distance of 1 mm is scratched into the coating. Adhesiveness was tested by tearing off a piece of previously applied transparent adhesive tape. Assessment was made similar to DIN 53 51, division was made into classifications Gt 0 to Gt 4, the latter signifying poor adhesion.

The adhesiveness test described was repeated after aging in a hot and humid environment (test conditions during storage in the hot and humid environment: Duration 750 h, up to 60° C. and 75% relative humidity).

The following results were obtained:

| Example No. | Gt prior to storage | Gt after storage in hot and humid environment |
|---|---|---|
| 1 | 0 | 0 |
| 2 | 0 | 0 |
| 3 | 0 | 1 |

In this connection, a cross cutting value of 1 means that slight splintering of the lacquer occurred at the intersections of the grid lines. This does not indicate decreased adhesion of the present hard coatings, because it could have been caused during initial scratching.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A UV hardenable lacquer suitable for coating molded polycarbonate (PC) bodies, comprising:
   (A) 5 to 60%, based on a total weight of 100% of the entire mixture, of a cross-linkable aliphatic polyurethane acrylate;
   (B) 30 to 45%, based on the total weight of 100% of the entire mixture, of a cross-linkable, polyfunctional acrylate having less than 20 C atoms in the molecule;
   (C) 0.01 to 3%, based on the total weight of 100% of the entire mixture, of a cross-linkable polyfunctional silicon acrylate;
   (D) optionally, between 1 and 5%, based on the total weight of 100% of the entire mixture, of a monofunctional, ethylenically unsaturated compound;
   (E) an amount up to 70% based on the total weight of 100% of the entire mixture, of at least one organic solvent, wherein said organic solvent is a mixture of 0 to 20% of an ester and 80 to 100% of a mixture of alcohols with varying evaporation rates;
   (F) a photo initiator;
   (G) optionally, a light protector.

2. A UV hardenable lacquer in accordance with claim 1, wherein the aliphatic polyurethane acrylate has a molecular weight of 800 to 1200.

3. A UV hardenable lacquer in accordance with claim 1, wherein the polyfunctional acrylate comprises a pentaerythritol tri- or tetraacrylate.

4. A UV hardenable lacquer in accordance with claim 1, wherein the polyfunctional acrylate is tri-functional, tetra-functional, or a mixture of tri- and tetrafunctional acrylates.

5. A UV hardenable lacquer in accordance with claim 1, wherein the polyfunctional silicon acrylate is di- up to hexa-functional.

6. A UV hardenable lacquer in accordance with claim 1, wherein said light protector comprises an amine with steric hindrance.

7. A UV hardenable lacquer in accordance with claim 1, comprising 5-20% of a hexa-functional polyurethane acrylate.

8. A UV hardenable lacquer in accordance with claim 1, wherein said ethylenically unsaturated compound is N-vinyl pyrrolidone.

9. A UV hardenable lacquer suitable for coating molded polycarbonate (PC) bodies, comprising:
   (A) 5 to 60%, based on a total weight of 100% of the entire mixture, of a cross-linkable aliphatic polyurethane acrylate;
   (B) 30 to 45%, based on the total weight of 100% of the entire mixture, of a cross-linkable, polyfunctional acrylate having less than 20 C atoms in the molecule;
   (C) 0.01 to 3%, based on the total weight of 100% of the entire mixture, of a cross-linkable polyfunctional silicon acrylate;
   (D) optionally, between 1 and 5%, based on the total weight of 100% of the entire mixture, of a monofunctional, ethylenically unsaturated compound;
   (E) an amount up to 70% based on the total weight of 100% of the entire mixture, of at least one organic solvent, wherein said organic solvent comprises a non-aprotic solvent;
   (F) a photo initiator;
   (G) optionally, a light protector.

10. A UV hardenable lacquer according to claim 9, wherein said solvent is present in an amount of approximately 48%.

11. A UV hardenable lacquer according to claim 9, wherein said photo-initiator is present in an amount of about 1%, said light protector is optionally present in an amount of up to 5% by weight, said ethylenically unsaturated compound is optionally present in said amount of between 1 and 5%, said cross-linkable polyfunctional silicon acrylate is present in said amount of 0.01 to 3%, said cross-linkable polyfunctional acrylate having less than 20 C atoms in the molecule is present in said amount of 30 to 45%, said aliphatic polyurethane acrylate is present in an amount of 5 to 20 parts by weight, the remainder consisting essentially of said at least one organic solvent.

* * * * *